US007255817B2

(12) United States Patent
Tazawa et al.

(10) Patent No.: US 7,255,817 B2
(45) Date of Patent: Aug. 14, 2007

(54) METHOD FOR COMPRESSION-MOLDING A CYLINDRICAL TABLET

(75) Inventors: Kazuharu Tazawa, Mie (JP); Atsuhisa Maeda, Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 383 days.

(21) Appl. No.: 11/045,307

(22) Filed: Jan. 31, 2005

(65) Prior Publication Data

US 2005/0263926 A1 Dec. 1, 2005

Related U.S. Application Data

(63) Continuation of application No. PCT/JP04/14392, filed on Sep. 30, 2004.

(30) Foreign Application Priority Data

May 26, 2004 (JP) ............................ 2004-156474

(51) Int. Cl.
*B29C 43/08* (2006.01)

(52) U.S. Cl. ...................................... 264/40.1; 264/109

(58) Field of Classification Search ..................... None
See application file for complete search history.

(56) References Cited

FOREIGN PATENT DOCUMENTS

| | | |
|---|---|---|
| JP | 59-46132 | 3/1984 |
| JP | 62-36739 | 8/1987 |
| JP | 62-36740 | 8/1987 |
| JP | 8-206892 | 8/1996 |
| JP | 10-29097 | 2/1998 |

*Primary Examiner*—Mary Lynn Theisen
(74) *Attorney, Agent, or Firm*—Oblon, Spivak, McClelland, Maier & Neustadt, P.C.

(57) ABSTRACT

A method for compression molding a cylindrical tablet is presented, the method being capable of preventing the occurrence of cracks and the breakage of core punches. The method for compression molding a cylindrical tablet is achieved by using a rotary powder compression molding machine provided with a die and upper and lower punches fitted to a rotary table and a core punch penetrating the punch end of a lower punch. The compression molding method being characterized by using the core punch in which the difference between the smallest diameter of the core punch at the protion for forming the center opening of the cylindrical tablet and the reference diameter of the portion in design is within 0.04 mm.

7 Claims, 4 Drawing Sheets

Compression-molding Drawing molded product

29: A/D converter

30: Image memory

31: Differentiator

32: Edge detector

33: Edge memory

34: Distance calculator

35: Image monitor

METHOD FOR COMPRESSION-MOLDING A CYLINDRICAL TABLET

TECHNICAL FIELD

The present invention relates to a method for compression-molding a cylindrical tablet. In particular, it relates to a compression molding method for detecting earlier the wearing of any core punch in a rotary molding machine for producing cylindrical tablets to prevent the occurrence of a defective product and the breakage of a core punch.

BACKGROUND ART

A fixed bed catalytic reactor to be used for a gas phase catalytic reaction of an olefin or tertiary butanol to produce the corresponding unsaturated aldehyde and/or unsaturated carboxylic acid, or for a gas phase catalytic reaction of an unsaturated aldehyde to produce the corresponding unsaturated carboxylic acid, has a merit in that usually the flow of the reaction gas can be substantially approximated to the extrusion flow, and thus, the reaction yield is high, and an intermediate product in a sequential reaction can be obtained in good yield. On the other hand, the heat conduction ability of the fixed bed is low, and no adequate removal or supply of heat of reaction may be carried out, whereby the temperature within the catalyst layer may tend to be non-uniform, and in a highly exothermic reaction like an oxidation reaction, a temperature peak may be created within the layer so that the temperature control may become difficult, thus leading to a danger of a runaway reaction.

Further, in order to obtain the desired product in good yield, it is necessary to make the particle size of the solid catalyst as far as possible to reduce the dispersion resistance within the particles. On the other hand, if the particle size is made too small, the pressure loss will increase, thus increasing a possibility of a runaway reaction, and if the desired product is an intermediate product, the sequential reaction tends to proceed too much, such being undesirable.

In order to avoid the runaway reaction due to the temperature peak or to reduce the pressure loss, various methods have been proposed. For example, there are proposals such that when acrolein or the like is produced by a gas phase catalytic reaction of propylene or the like with air or gas containing free oxygen, the catalyst is shaped into a cylindrical form but not a circular column shape, whereby the pressure loss can be suppressed, and further, heat removing effect can be increased (see Patent Documents 1 to 3).

Heretofore, there has been known such a rotary powder compression molding machine for producing tablets, electronic parts etc. in which dies and upper and lower punches fitted to a rotary table are passed between upper and lower rollers with the rotation of the rotary table to move the upper and lower punches in their axial directions whereby powder filled in each die is compressively molded. In this type of rotary powder compression molding machine, there is of such a structure that in order to form a so-called cylindrical tablet being a ring-shaped product having a penetration hole in its center, a core punch is provided so as to project from the center of the punch end of a lower punch, and an upper punch has a center hole at the center of its punch end so as to allow the insertion of the core punch (see Patent document 4).

Patent Document 1: JP-A-59-46132
Patent Document 2: JP-B-62-36739
Patent Document 3: JP-B-62-36740
Patent Document 4: JP-A-10-29097

DISCLOSURE OF THE INVENTION PROBLEM THAT THE INVENTION IS TO SOLVE

In such compression-molding machine, however, the portion of core punch effective for the compressively molding of a cylindrical tablet was worn out with repetitiously compression-molding to create a gentle concave surface as shown in FIG. 6. Accordingly, the inner surface of the opening of the cylindrical tablet compressively molded had a gentle convex surface, and when the cylindrical tablet was drawn out from the core punch by pushing the lower punch upward, bad appearance such as cracking or breaking was easily caused in the products. Further, the wearing of the core punch created a wider gap between the core punch and the penetration hole at the central portion of the end of the lower punch. Then, the powder to be molded would fill the gap. In this case, an excessive force was applied to the core punch by pushing down the lower punch, which was projected in order to drawn out a cylindrical tablet, to a predetermined position in order to charge powder to be molded in a die, whereby the core punch might be broken or might cause fluctuation of weight in products because the lower punch could not be descended to a predetermined position. It could not be clarified that a core punch would reach the limit of wearing when how many times of compression-molding were repeated. Under these circumstances, the wearing is judged only when the bad appearance of products is detected, and then, punches are exchanged. Such follow-up measures created problems of reduction in yield and reduction in the quality of products, and of damaging the surface of the rotary table and the surface of the die due to the broken core punch.

The present invention has been achieved to solve these problems, and is to detect earlier the degree of wearing of any core punch to prevent the occurrence of a defective product and the breakage of a core punch in a rotary powder molding machine for molding a cylindrical tablet.

Means of Solving Problems

The inventors of this application have studied earnestly about the bad appearance such as cracking or breaking of a shaped product and the occurrence of the breakage of a core punch in the compression-molding of cylindrical tablets, and have found that the degree of developing of wearing in the core punch influences largely the occurrence of the bad appearance of the molded product. Namely, they have found that when a core punch in which the difference between the smallest diameter of the core punch at the portion for forming the center opening of the cylindrical tablet and the reference diameter of the portion in design, which is caused by the wearing of the core punch, is more than 0.04 mm, the bad appearance of the molded product takes place and the rate of occurrence of the breakage of the punch increases.

The present invention can be achieved based on such knowledge, and is to provide a method for compression-molding a cylindrical tablet in which a worn core punch is replaced by a new one wherein the difference between the smallest diameter of the core punch at the portion for forming the center opening of a cylindrical tablet and the reference diameter of the portion in design, is within 0.04 mm, whereby occurrence of a defective product and the breakage of a core punch can be avoided.

(1) A method for compression-molding a cylindrical tablet by using a rotary powder compression molding machine provided with a die and upper and lower punches fitted to a rotary table, a core punch penetrating the punch end of a lower punch at the center in a horizontal direction of the punch end of the lower punch, the core punch being movable in a sliding direction of the lower punch, and a center hole formed at the center in a horizontal direction of the punch end of the upper punch to allow the insertion of the core punch at the time of compression molding, wherein the upper and lower punches are moved in their axial directions by upper and lower rollers while the upper and lower punches are passed between the upper and lower rollers with the rotation of the rotary table whereby powder filled in the die is compressively molded, the compression-molding method being characterized by using the core punch in which the difference between the smallest diameter of the core punch at the portion for forming the center opening of the cylindrical tablet and the reference diameter of the portion in design, is within 0.04 mm.

(2) The compression-molding method for a cylindrical tablet according to the above-mentioned (1), wherein preparing a working curve based on the number of compression-molding and the difference between the diameter of the core punch at the portion for forming the center opining of a cylindrical tablet before compression-molding and the smallest diameter of the portion after compression-molding; predicting before compression-molding the number of compression-molding based on the working curve in the estimation that the difference between the reference diameter of the portion in design and the smallest diameter exceeds 0.04 mm due to the wearing of the portion; measuring the smallest diameter of the core punch at the portion for forming the center opening of the cylindrical tablet before the number of compression-molding, after the initiation of compression-molding, reaches the predicted number, and exchanging the core punch to a new core punch so that the difference between the reference diameter and the smallest diameter is within 0.04 mm.

(3) The compression-molding method for a cylindrical tablet according to the above-mentioned (1) or (2), wherein calculating the standard deviation and the averaged value of compression-molding pressure based on compression-molding pressures on each punch in one turn of the rotary table, the compression-molding pressures being detected by a sensor located at either one of the upper and lower rollers; measuring the smallest diameter of the core punch at the portion for forming the center opening of the cylindrical tablet when the compression-molding pressure of punch is smaller than the value obtained by subtracting the standard deviation multiplied with a coefficient of 2 to 5 from the averaged value, and exchanging the core punch so that the difference between the reference diameter and the smallest diameter is within 0.04 mm.

(4) The compression-molding method for a cylindrical tablet according to anyone of the above-mentioned (1) to (3), wherein measuring precisely the smallest diameter of the core punch at the portion for forming the center opening of a cylindrical tablet with a contactless measuring device capable of reading at least 0.01 mm as the smallest value.

(5) The compression-molding method for a cylindrical tablet according to any one of the above-mentioned (1) to (4), which comprises compression-molding into a cylindrical shape a composite oxide catalyst having the following formula (1) and containing molybdenum as the main component, to be used for a gas phase catalytic oxidation reaction of an olefin or tertiary butanol to produce the corresponding unsaturated aldehyde and/or unsaturated carboxylic acid:

MoaBibCocNidFeeXfYgZhQiSijOk (1)

(wherein X represent at least one element selected from the group consisting of Na, K, Rb, Cs and Tl, Y represents at least one element selected from the group consisting of B, P, As and W, Z represents at least one element selected from the group consisting of Mg, Ca, Zn, Ce and Sm, Q represents a halogen atom, and a to k represent atomic ratios of the respective elements, provided that when a=12, $0.5 \leqq b \leqq 7$, $0 \leqq c \leqq 10$, $0 \leqq d \leqq 10$, $1 \leqq c+d \leqq 10$, $0.05 \leqq e \leqq 3.0$, $0.0005 \leqq f \leqq 3$, $0 \leqq g \leqq 3$, $0 \leqq h \leqq 1$, $0 \leqq i \leqq 0.5$ and $0 \leqq j \leqq 40$, and k is a numerical value satisfying the oxidized states of other elements.)

(6) The compression-molding method for a cylindrical tablet according to any one of the above-mentioned (1) to (4), which comprises compression-molding into a cylindrical shape a composite oxide catalyst having the following formula (2) and containing molybdenum as the main component, to be used for a gas phase catalytic oxidation reaction of an unsaturated aldehyde to produce the corresponding unsaturated carboxylic acid:

MoaVbCucXdYeZfOg (2)

(wherein X represent at least one element selected from the group consisting of W and Nb, Y represents at least one element selected from the group consisting of Fe, Co, Ni and Bi, Z represents at least one element selected from the group consisting of Ti, Zr, Ce, Cr, Mn and Sb, and a, b, c, d, e, f and g represent atomic ratios of the respective elements, provided that when a=12, $1 \leqq b \leqq 12$, $0 \leqq c \leqq 6$, $0 \leqq d \leqq 12$, $0 \leqq e \leqq 100$ and $0 \leqq f \leqq 100$, and g is the number of oxygen atoms required to satisfy the atomic valence of the above respective components.)

(7) The compression-molding method for a cylindrical tablet according to the above-mentioned (5) or (6), wherein the composite oxide catalyst has an opening in the longitudinal direction so that the outer diameter is from 3 to 10 mm, the length is from 0.5 to 2 times the outer diameter and the inner diameter is from 0.1 to 0.7 time the outer diameter.

Effects of in the Invention

According to the present invention, in a rotary powder molding machine for producing the molded product of a cylindrical tablet, the degree of wearing of a core punch at the portion for forming the center opening of the cylindrical tablet is detected in an earlier stage to exchange the core punch, whereby occurrence of a defective product and the breakage of a core punch can be avoided.

BRIEF DESCRIPTION OF IN THE DRAWINGS

EXPLANATION OF NUMERICAL REFERENCES

Figure 1:
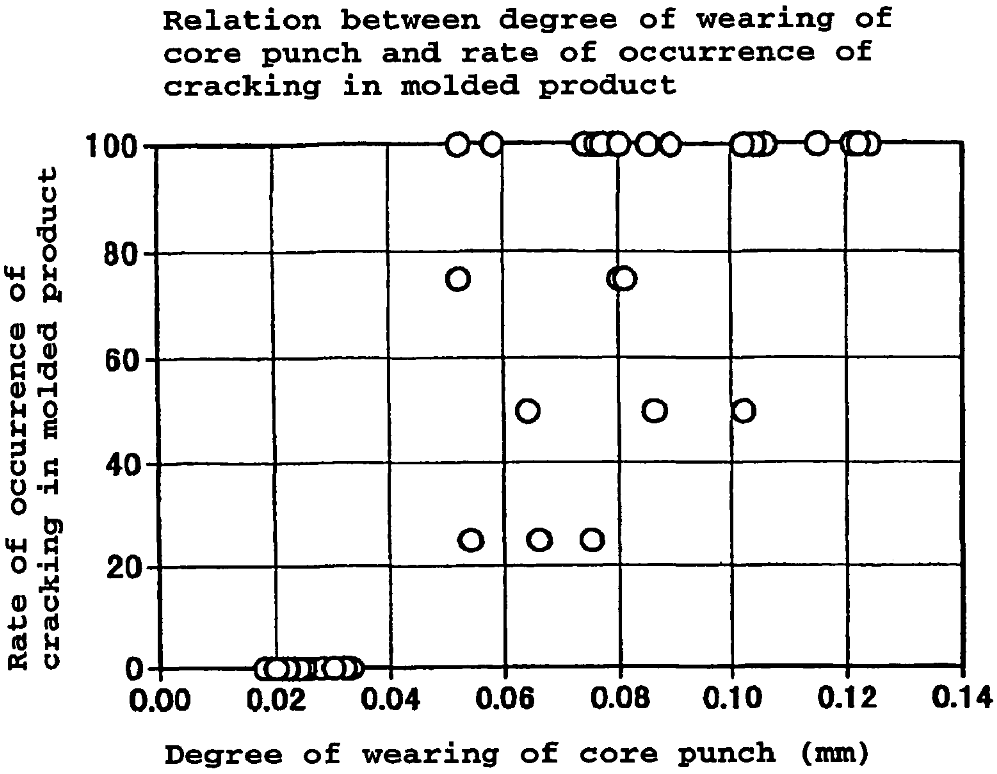
FIG. 1 is a diagram showing the relation between the degree of wearing of a core punch and the rate of occurrence of cracking in a cylindrical tablet in Example 1 of the present invention.

1: agitating and filling device, 2: preliminarily pressing roller, 3: regularly pressing roller, 4: scraper, 5: rotary table, 6: lower punch descending device, 7: weight adjusting track, 8: raising track, 9: raw material hopper, 10: upper punch, 11: lower punch, 12: die, 13: molded product, 14: core punch, 15: lower punch fixing ring, 16: lower punch holder cap, 17: lower punch holder, 18: core punch fixing pin, 19: upper punch fixing cap, 20: upper punch holder, 21: light-emitting diode, 22: diffusion plate, 23: aperture, 24: projection lens, 25: first lens, 26: aperture, 27: second lens, 28: image pickup device, 29: A/D converter, 30: image memory, 31: differentiator, 32: edge defector, 33: edge memory, 34: distance calculator, 35: image monitor, 36: catalyst powder, 37: center hole

Best Mode For Carrying Out In The Invention

Examples of the present invention will be explained in more detail with reference to the drawing. However, the drawing and the description are for understanding the present invention, and the present invention is not limited to these.

Figure 3:
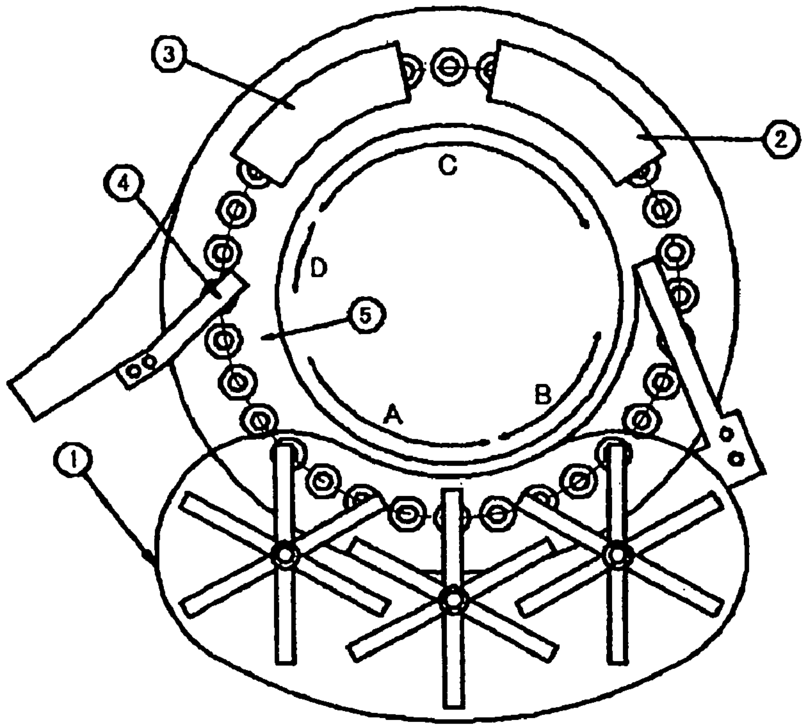
FIG. 3 is a diagrammatical plane view of a rotary compression-molding machine according to a preferred embodiment of the present invention.
Figure 4:
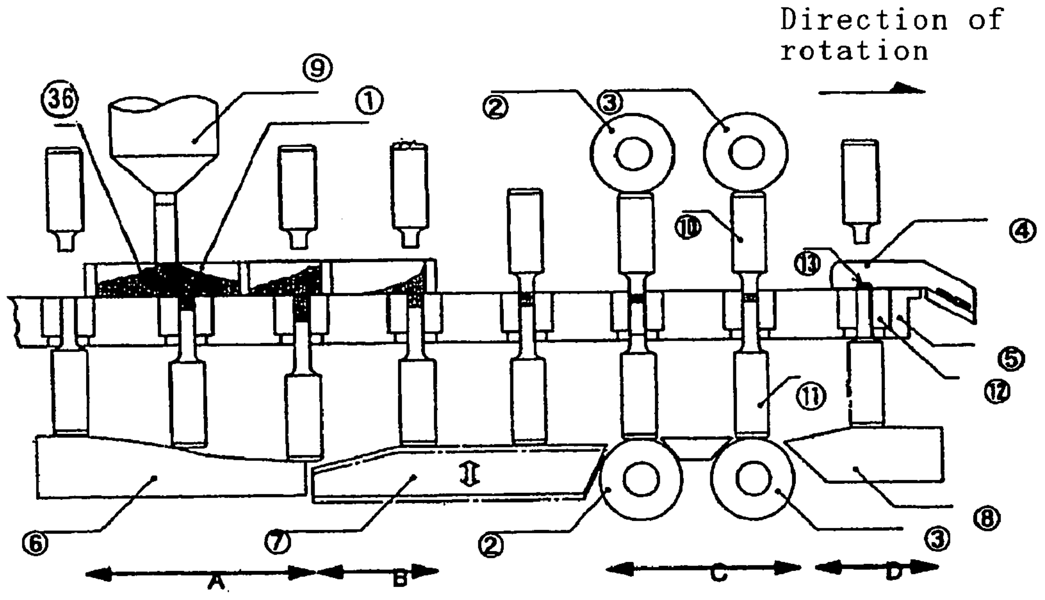
FIG. 4 is a side view diagrammatically developed of the rotary compression-molding machine in FIG. 3.

The rotary compression-molding machine usable in the present invention has a rotating circular plate-like horizontal rotary table 5 as shown in FIGS. 3 and 4. The rotary table 5 has a large number of dies 12 having die holes which are arranged at equal intervals in the rotating direction and which penetrate the dies in a vertical direction. At upper and lower positions of each die in the rotary table 5, an upper punch 10 and a lower punch 11 are provided in pair so as to correspond to each die hole, the paired upper and lower punches being movable up and down with the rotation of the rotary table. In such rotary compression-molding machine, molded products are produced in the following manner.

In a charging stage A, the lower punch 11 is inserted into each die hole from its lower portion so that the lower end of the die hole is always closed by the lower punch. The lower punch 11 is descended in the die hole by a relative movement on a lower punch descending device 6 in association with the rotation of the rotary table 5. Catalyst powder 36 is charged into each die hole. The lower descending device 6 has at its upper surface a cam face of declined slope in the moving direction of the lower punch 11. When the lower punch 11 moves relatively on the cam face, the lower punch 11 descends in the die hole. In a weight adjusting stage B, the position of the lower punch in the die hole is adjusted due to the vertical movement of a weight adjusting track 7, and the quantity of the powder to be charged is adjusted by leveling the powder on the rotary table. After the charging of the powder in the die hole, the lower punch 11 and the upper punch 10 are pushed by preliminarily pressing rollers 2 and regularly pressing rollers 3 respectively to compressively mold the powder in a compression-molding stage C, whereby a molded product 13 is formed in the die hole by the compression-molding of the powder. The molded product 13 formed in the die hole is pushed out from the die hole by the lower punch 11 ascended by a raising track 8, in a molded product drawing stage D, and then, the extruded product hits a scraper 4 to be taken out from the rotary molding machine to be used as a final product. Thus, the molded product is produced in each die hole with the rotation of the rotary table.

Figure 5:
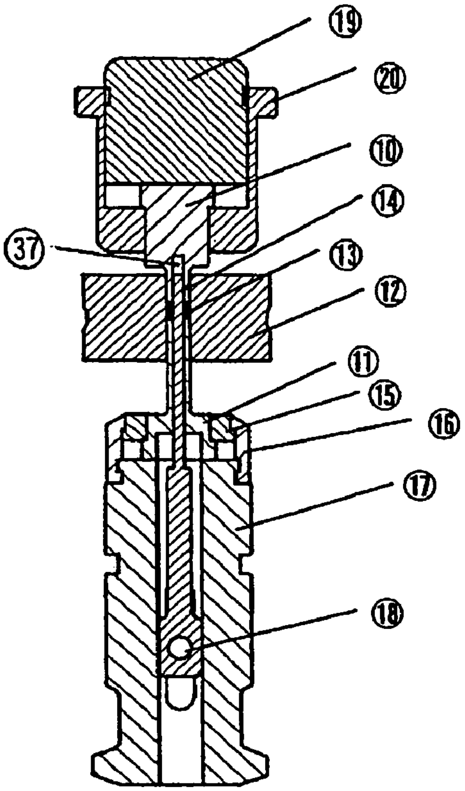
FIG. 5 is a cross-sectional view of the part for forming a cylindrical tablet according to a preferred embodiment of the present invention.

Further, the rotary compression-molding machine relating to the present invention is provided with a center hole 37 at the center of the punch end of each upper punch 10, the center hole permitting the insertion of the end of a core punch 14 projected from the center of the punch end of the lower punch 11 so as to form a penetration hole at the center of the molded product 13, as shown in FIG. 5. The core punch 14 is extendable in a sliding direction of the lower punch 11. The core punch may be fixed firmly to the rotary table by means of a core punch fixing pin 18 or may be connected to a roller in contact with a core punch track or rails (not shown).

Figure 6:
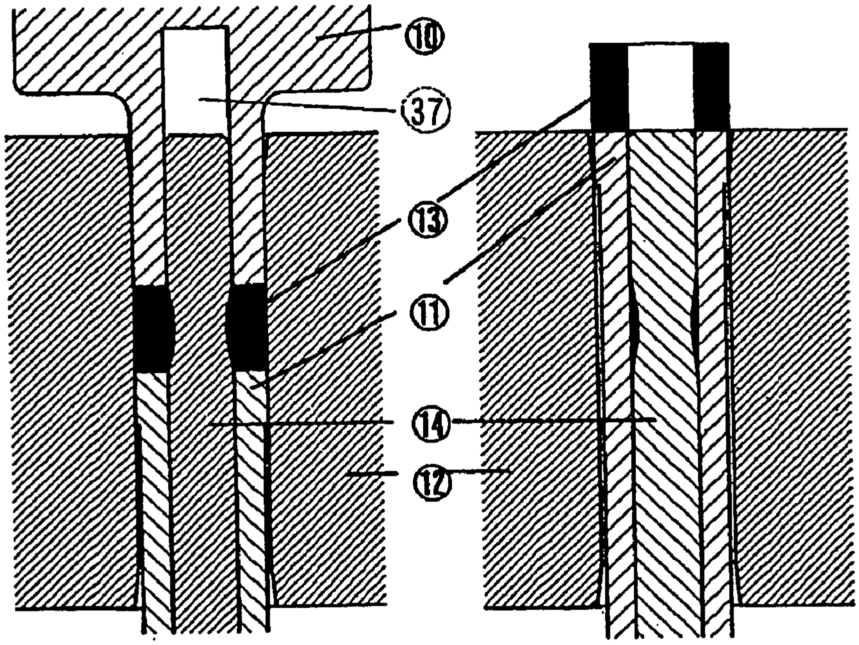
FIG. 6 is a diagrammatical view showing a state of the molded product drawn out with a worm core punch shown in FIG. 5.

With continuously compression-molding, the portion of forming the center opening of a cylindrical tablet in the core punch 14 is worn to create a gentle concave surface as shown in FIG. 6, and therefore, the inner surface of the opening of the compression-molded cylindrical tablet has a gentle convex surface. As is clear from FIG. 6, the concave surface results at a portion which is slightly lower than the top end portion of the core punch and which is apt to be worn due to the largest pressure acting thereon. Since the top end portion of the core punch 14 has a larger diameter than the worn portion, if the wearing of the portion progresses, bad appearance such as cracking or breaking is caused in the molded product 13 when the lower punch 11 is pushed upward to draw the cylindrical tablet.

Further, the worn portion of the core punch 14 creates a wider gap between the worn portion and the inner wall of the penetration hole in the intermediate portion at the end of the lower punch. Then, powder to be molded fills the gap, and the powder is solidified during repetitively compression-molding whereby the lower punch 11 does not work well. As a result, when the lower punch 11 is descended to a predetermined position in order to charge the powder for molding in the die, the core punch may be broken due to an excessive force acting on the core punch 14, or weight of the product may fluctuate because the lower punch cannot be descended to the predetermined position. Accordingly, it is important in manufacturing cylindrical tablets to detect earlier the degree of wearing of such portion of the core punch 14. However, if the machine is stopped frequently to measure the diameter of the portion of the core punch 14 in order to detect the degree of wearing of the portion, productivity for cylindrical tablets decreases, such being undesirable.

In consideration of the above, the method for compression-molding a cylindrical tablet is presented, wherein a working curve is prepared based on the number of compression-molding and the difference between the diameter of the core punch 14 at the portion for forming the center opining of a cylindrical tablet before compression-molding and the smallest diameter of the portion after compression-molding; the number of compression-molding is predicted before compression-molding, based on the working curve in the estimation that the difference between the reference diameter of the portion in design and the smallest diameter exceeds 0.04 mm due to the wearing of the portion; the smallest diameter of the core punch at the portion for forming the center opening of the cylindrical tablet is measured before the number of compression-molding, after the initiation of compression-molding, reaches the predicted number, and the core punch is exchanged to a new core punch so that the difference between the reference diameter and the smallest diameter is within 0.04 mm. Thus, the manufacture of cylindrical tablet can be proceeded stably without reducing productivity.

Further, when the above-mentioned portion of the core punch is worn, the gap between the portion and the penetration hole in the intermediate portion at the end of the lower punch becomes wider. If the powder to be molded fills the gap, the lower punch does not work well and it can not be descend to a predetermined position whereby a predetermined quantity of powder cannot be charged in the die hole. Thus, if the predetermined quantity of powder cannot be charged in the die hole, the pressure of compression-molding becomes lower than that in the normal condition. According to a preferred embodiment of the present invention focusing this point, the compression-molding pressure on either one of the pressing rollers is detected through a sensor (not shown); the machine is stopped when the detected compression-molding pressure is abnormality low; the smallest diameter of the core punch, which is inserted in the lower punch, at the portion for forming the center opening of the cylindrical tablet is measured, and the core punch is exchanged to an another one so that the difference between the smallest diameter of the core punch at the portion and the reference diameter of the portion in design is within 0.04 mm, whereby the degree of wearing of the core punch can be detected in an earlier stage, and occurrence of a defective product and the breakage of the core punch can be prevented.

The value of compression-molding pressure to stop the machine is determined to be a value obtained by subtracting a value of a standard deviation multiplied with a coefficient of from 2 to 5 from an averaged compression-molding pressure, based on the standard deviation and the averaged compression-molding pressure calculated from compression-molding pressures of each punch for one round of the rotary table. The above-mentioned coefficient is preferred to be from 3 to 4 from the viewpoints of productivity and early detection of the wearing of the core punch. If the coefficient is smaller than 2, the machine had to be stopped frequently whereby productivity decreases. If the coefficient is larger than 5, the detection of the wearing of the core punch is delayed whereby bad appearance of the product or the breakage of the core punch is apt to occur, such being undesirable.

The measuring device for measuring the diameter of the core punch at the portion for forming the center opening of the cylindrical tablet, usable in the present invention is not in particular limited as long as it can read at least 0.01 mm as the least read value. In order to detect that the difference between the smallest diameter of the worn portion and the reference diameter of the portion in design is within 0.04 mm, it is sufficient that the smallest read value of the measuring device is at most 0.01 mm. However, when more precise measurement is required in order to get the information of wearing with time, measurement with a measuring device capable of reading at least 0.005 mm as the smallest value is preferred.

The slide gauge as a contactless measuring device, standardized in JIS B 7507 has the least read value of 0.01 mm. However, this measuring device is against the Appe's principle that "an object to be measured and a standard scale have to be arranged linearly in a measuring direction", and accordingly, it is undesirable because error is apt to occur due to an excessive measuring force.

A micrometer standardized in JIS B 7502 is a measuring device satisfying the Appe's principle, which has the least read value of 0.001 mm. It is suitable in the case that there is error due to displacements of a measuring device and an object to be measured in a measuring force within the elastic limit of the Hooke's law, or the surface to be measured is flat and has a diameter of at least 6 mm. However, it is not preferable to use the measuring device in the case of measuring the smallest diameter of the worn portion having a gentle concave surface as in the present invention because it indicates a larger value generated by the gap between the point of measurement and the measuring device.

On the other hand, a contactless measuring device is preferred because error due to displacements of an object to be measured and the measuring device in a measuring force within the elastic limit of the Hooke's law as seen in a contact type measuring device, does not takes place, and it can measure precisely the length, distance, shape or the like of each part of an object with the progress of an image processing technology or an image measuring technology in recent years.

Figure 7:
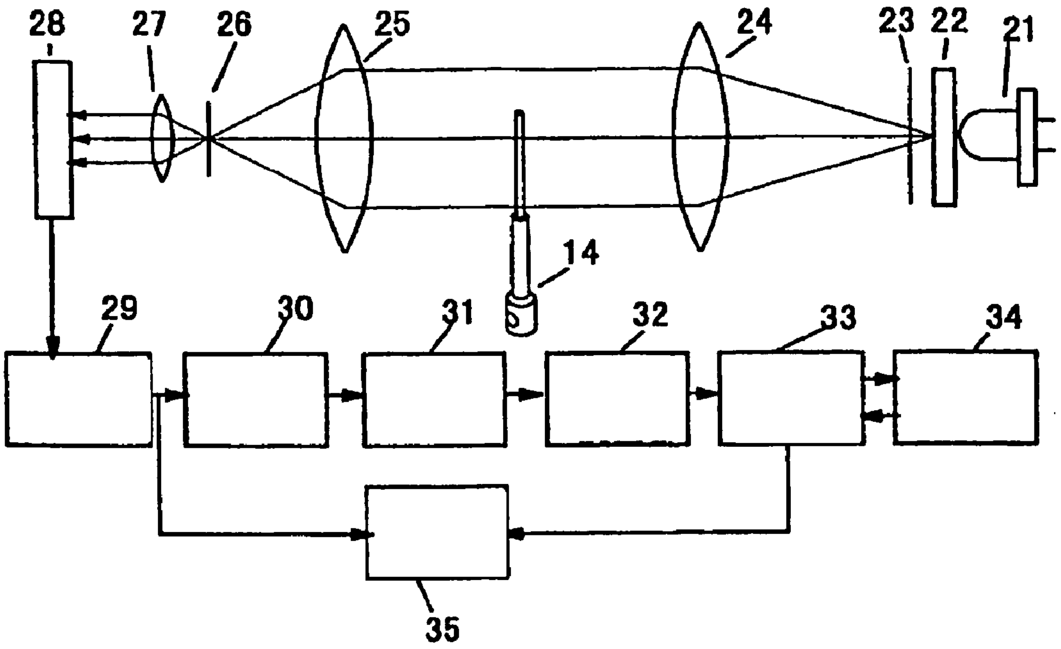
FIG. 7 is a block diagram showing the structure of a contactless measuring device according to a preferred embodiment of the present invention.

FIG. 7 shows an embodiment of the contactless measuring device. It has a light-emitting diode 21 as the light source. Light emitted from the light-emitting diode 21 is diffused by a diffusion plate 22, and the light diffused by the diffusion plate 22 is passed through the circular opening of an aperture 23 to have a circular shape. The light passing through the circular opening of the aperture 23 enters into a projection lens 24 by which it is converted into parallel light propagating in a horizontal direction. The parallel light is irradiated to a core punch 14 as an object to be measured. The light passing the object to be measured is focused by a first lens 25, passing through the circular opening of an aperture 26 to thereby produce an image in the light-sensitive area of CCD28 by means of a second lens 27. CCD28 produces an analog output signal in response to the quantity of light received. An A/D converter (analog/digital converter) 29 converters the output signal from CCD28 into a digital signal. The digital signal is written as image data into an image memory 30, and it is also fed to an image monitor 35. A differentiator 31 differentiates the image data read from the image memory 30. An edge detector 32 detects the peak position in picture element level, of the output signal from the differentiator 31 to write the detected peak position into an edge memory 33 as an edge coordinate in picture element level. A distance calculator 34 calculates the distance between optional two points of the object to be measured based on the edge coordinate memorized in the edge memory 33 and stores the result of calculation in the edge memory 33. The image monitor 35 displays the image data from the A/D converter 29 as an image of the object to be measured, and displays also the result of calculation memorized in the edge memory 33.

In such contactless measuring device, the light emitted from the single light-emitting diode 21 is diffused by the diffusion plate 22, the diffused light is formed into a circular shape by the aperture 23 and then, the circular light is converted into parallel light, whereby the light quantity can be distributed uniformly and unevenness does not occur in the light. Accordingly, a highly accurate measured value can preferably be obtained. Further, use of the single light-emitting diode of lower power consumption minimizes error of measurement due to a mechanical strain in the optical system caused by heat or the thermal expansion of the core punch as the object to be measured, such being further preferable.

The present invention can be applied to the molding of various kinds of powder usable for catalyst, tablet etc. into a cylindrical tablet. In the present invention, the powder to be compressively molded may be powder having hardwearing properties. However, the present invention is useful for compression-molding powder having wearing properties, in particular, catalyst powder including a metal component. In the present invention, it is in particular preferred to use powder of a composite oxide catalyst having the following formula (1) and containing molybdenum as the main component, to be used for a gas phase catalytic oxidation reaction of an olefin or tertiary butanol to produce the corresponding unsaturated aldehyde and/or unsaturated carboxylic acid:

MoaBibCocNidFeeXfYgZhQiSijOk (1)

(wherein Mo represents molybdenum, Bi represents bismuth, Co represents cobalt, Ni represents nickel, Fe represents iron, Si represents silicon, O represents oxygen, X represent at least one element selected from the group consisting of Na, K, Rb, Cs and Tl, Y represents at least one element selected from the group consisting of B, P, As and W, Z represents at least one element selected from the group consisting of Mg, Ca, Zn, Ce and Sm, Q represents a halogen atom, and a to k represent atomic ratios of the respective elements, provided that when $a=12$, $0.5\leqq b\leqq 7$, $0\leqq c\leqq 10$, $0\leqq d\leqq 10$, $1\leqq c+d\leqq 10$, $0.05\leqq e\leqq 3.0$, $0.0005\leqq f\leqq 3$, $0\leqq g\leqq 3$, $0\leqq h\leqq 1$, $0\leqq i\leqq 0.5$ and $0\leqq j\leqq 40$, and k is a numerical value satisfying the oxidized states of other elements.)

Further, according to the present invention, it is preferred to use powder of a composite oxide catalyst having the following formula (2) and containing molybdenum as the main component, to be used for a gas phase catalytic oxidation reaction of an unsaturated aldehyde to produce the corresponding unsaturated carboxylic acid:

MoaVbCucXdYeZfOg (2)

(wherein Mo represents molybdenum, V represents vanadium, Cu represents copper, O represents oxygen, X represent at least one element selected from the group consisting of W and Nb, Y represents at least one element selected from the group consisting of Fe, Co, Ni and Bi, Z represents at least one element selected from the group consisting of Ti, Zr, Ce, Cr, Mn and Sb, and a, b, c, d, e, f and g represent atomic ratios of the respective elements, provided that when $a=12$, $1\leqq b\leqq 12$, $0\leqq c\leqq 6$, $0\leqq d\leqq 12$, $0\leqq e\leqq 100$ and $0\leqq f\leqq 100$, and g is the number of oxygen atoms required to satisfy the atomic valence of the above respective components.)

The composite oxide catalyst to be compressively molded according to the present invention has a cylindrical shape having an opening in its longitudinal direction. A preferred cylindrical shape is such that the outer diameter is from 3 to 10 mm, the length is 0.5 to 2 times the outer diameter and the inner diameter is 0.1 to 0.7 time the outer diameter, from the viewpoints of the ability of removing reaction heat, the pressure loss of reaction gas, the strength of catalyst and so on. The catalyst of cylindrical shape having a numerical value in such range can satisfy all the above-mentioned characteristics. In particular, such one having an outer diameter of from 4 to 8 mm, a length 0.6 to 1.5 times the outer diameter and an inner diameter 0.3 to 0.5 time the outer diameter is in particular preferred.

EXAMPLES

In the following, the present invention will be described in detail with reference to Examples and Comparative Example. However, the present invention should not be limited to these Examples.

Example 1

3.65 parts (part by weight the same in the following description) of basic nickel carbonate ($NiCO_3$-$2Ni(OH)_2$-$4H_2O$) was dispersed in 3.75 parts of pure water. 1.22 parts of silicon dioxide (carplex #67, manufactured by Shionogi & Co., Ltd.) and 2.4 parts of antimony trioxide were added thereto and stirring sufficiently. This slurry was heated, concentrated and dried, and the obtained solid was calcined at 800° C. for 3 hours. The calcined product was pulverized to at least 60 mesh. 3.8 parts of pure water in a melting vessel provided with a stirrer was heated to 80° C., and 1.0 part of ammonium paramolybdate, 0.135 part of ammonium metavanadate, 0.130 part of ammonium paratungstate and 0.08 part of copper sulfate, and the entire amount of the powder obtained as described above, were sequentially added with stirring. This slurry containing the catalyst component was heated and dried to obtain a catalyst powder having a composition (atomic ratio) of Sb:Ni:Si:Mo:V:W:Cu=100:43:80:35:7:3:3.

Then, by using a rotary compression-molding machine mounted with a die having a die hole having a reference diameter of 6 mm with a plus tolerance of from 0 to 0.02 mm, a lower punch having the punch end having a reference diameter of 6 mm with a minus tolerance of from 0.02 to 0.04 mm and having a penetration hole having a reference diameter of 3 mm with a plus tolerance of from 0.01 to 0.03 mm at the center in the horizontal plane of the punch end, an upper punch having the punch end having a reference diameter of 6 mm with a minus tolerance of from 0.02 to 0.04 mm and having a hole having a reference diameter of 3 mm with a plus tolerance of from 0.01 to 0.03 mm at the center in the horizontal plane of the punch end, and a core punch having a reference diameter of 3 mm with a minus tolerance of from 0.01 to 0.03 mm, the catalyst powder was compressively molded at a rotating speed of 20 rpm and a compression-molding pressure of 1 ton/punch to produce about 1000000 cylindrical tablets each having a weight of 200 mg and a thickness of 4 mm, for each punch. In this case, the compression-molding was continued by replacing the core punches broken during compression-molding with new ones. After the compression-molding, the rotary table was manually rotated with a hand steering wheel provided in the compression-molding machine to take out, with tweezers, carefully cylindrical tablets drawn out in the molded product drawing stage. This operation was conducted for each of 4 turns of the rotary table.

Then, the core punches were removed from the compression-molding machine, and the smallest diameter D of each core punch at the portion for forming the opening of the cylindrical tablet, was measured with a contactless measuring device (high precision two-dimensional measuring device VM-8000, manufactured by KEYENCE CORPORATION). Then, the surface of the cylindrical tablets produced during 4 turns of the rotary table, corresponding to the core punches removed, was observed to detect the presence or absence of cracking, and the rate of occurrence of cracking (including breaking) in the cylindrical tablets in the 4 turns of the rotary table was examined with respect to all the core punches. The difference between the reference diameter of 3 mm of the core punch in design and the smallest diameter D of the core punch was determined to be the degree of wearing of the core punch, and the relation of the wearing of the core punch to the rate of occurrence of cracking in cylindrical tablets was plotted. As a result, the relation as shown in FIG. 1 was obtained.

Example 2

Figure 2:
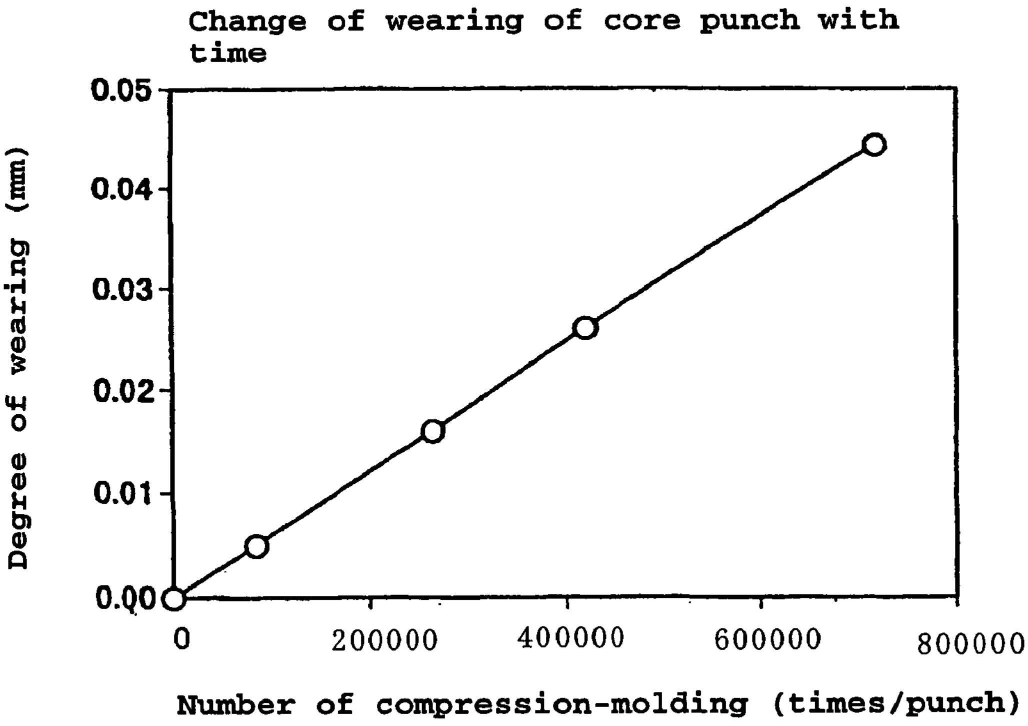
FIG. 2 shows a working curve showing the degree of wearing of a core punch based on number of compression-molding per each punch in Example 2 of the present invention.

Unused core punches were mounted on the rotary compression-molding machine after the diameters D0 of their portions for forming openings in cylindrical tablets were-measured with the high precision two-dimensional measuring device. Then, the catalyst powder obtained in Example 1 was compressively molded under the same conditions as Example 1. When the number of compression-molding per punch reached 84000 tablets, 265000 tablets, 420000 tablets and 720000 tablets respectively, the core punches were removed to measure the smallest diameters D of the portions for forming the openings of the cylindrical tablets, of the punches in the same manners Example 1. The difference between the diameter D0 of each of the unused core punches and the smallest diameter D thereof was determined to be the degree of wearing, and the changes with time of the degree of wearing based on the number of compression-molding per punch were plotted. As a result, the working curve as shown in FIG. 2 was obtained.

Example 1 shows the occurrence of cracks in cylindrical tablets when the difference between the reference diameter of the portion of the core punch in design and the smallest diameter of the portion thereof due to wearing becomes larger than 0.04 mm, and shows that the occurrence of cracks in cylindrical tablets can be prevented by controlling the diameter of the portion of each core punch. Example 2 shows that the wearing of the core punch is in proportion to the number of compression-molding, and that the control of the wearing of the core punch can efficiently be carried out by controlling the timing of measuring the smallest diameter of the portion of each core punch based on the number of compression-molding.

Comparative Example 1

On cylindrical tablets sampled just before the termination of the compression-molding in Example 1, the presence or absence of cracking was examined in the same manner as Example 1. As a result, cracks were found in 48% of cylindrical tablets.

Example 3

Unused core punches having an averaged diameter of 2.98 mm at the portion for forming an opening in each cylindrical tablet were attached to the rotary compression-molding machine, and the catalyst powder obtained in Example 1 was compressively molded under the same conditions as Example 1. The smallest diameter of the portion of each core punch was measured in the same manner as Example 1 every 150000 per punch, at which number the diameter was estimated to reach 2.97 mm as an intermediate diameter between 2.96 mm which was 0.04 mm smaller than 3 mm as the reference diameter of the unused core punch and 2.98 mm as the averaged diameter, which is obtainable from FIG. 2. When the measured core punch had a value smaller than 2.97 mm, it was exchanged to a new one having a diameter of at least 2.97 mm, and the compression-molding operation was continued until about 1000000 per punch. Cylindrical tablets were sampled just before the termination of the compression-molding to examine the presence or absence of cracks in the same manner as Example 1. As a result, no crack was found.

Example 4

The rotary compression-molding machine was setup so as to be stopped when the compression-molding pressure value is smaller than the value obtained by subtracting the standard deviation multiplied with a coefficient of 4 from an averaged compression-molding pressure, the standard deviation and the averaged compression-molding pressure being calculated from compression-molding pressures for each punch in one turn of the rotary table, and the catalyst powder obtained in Example 1 was compressively molded to produce about 1000000 tablets per punch under the same conditions as Example 1. In this case, the smallest diameter of the portion for forming the opening of a cylindrical tablet, of the core punch which satisfied the condition of stopping the rotary compression-molding machine, was measured under the same conditions as Example 1, and the core punch having a smallest diameter of less than 2.96 mm at the portion for forming the opening of a cylindrical tablet was replaced by a fresh core punch having a smallest diameter of at least 2.96 mm, to continue the compression-molding. Cylindrical tablets were sampled just before the termination of the compression-molding to examine the presence or absence of cracks in the same manner as Example 1. As a result, no crack was found.

In Comparative Example, the occurrence of cracks was found since no control to the wearing of core punches was carried out. However, Example 3 shows that the occurrence of cracks in cylindrical tablets can be prevented by controlling the wearing of core punches with the number of times of compression-molding based on the working curve shown in FIG. 2. Further, in Example 4, attention is paid to the fact that the compression-molding pressure decreases with the progress of the wearing of a core punch, and the occurrence of cracks in cylindrical tablets can also be prevented by controlling the wearing of core punches with the compression-molding pressure.

INDUSTRIAL APPLICABILITY

In the present invention, the wearing of the core punch at the portion for forming the center opening of a cylindrical tablet in a rotary molding machine is detected quantitatively, and the core punch is exchanged to prevent the occurrence of cracks in cylindrical tablets. Accordingly, the present invention can be utilized to compressively mold various cylindrical tablets.

The entire disclosure of Japanese Patent Application No. 2004-156474 filed on May 26, 2004 including specification, claims, drawings and summary is incorporated herein by reference in its entirety.

What is claimed is:

1. A method for compression-molding a cylindrical tablet by using a rotary powder compression-molding machine provided with a die and upper and lower punches fitted to a rotary table, a core punch penetrating the punch end of a lower punch at the center in a horizontal direction of the punch end of the lower punch, the core punch being movable in a sliding direction of the lower punch, and a center hole formed at the center in a horizontal direction of the punch end of the upper punch to allow the insertion of the core punch at the time of compression-molding, wherein the upper and lower punches are moved in their axial directions by upper and lower rollers while the upper and lower punches are passed between the upper and lower rollers with the rotation of the rotary table whereby powder filled in the die is compressively molded, the compression-molding method being characterized by using the core punch in which the difference between the smallest diameter of the core punch at the portion for forming the center opening of the cylindrical tablet and the reference diameter of the portion in design, is within 0.04 mm.

2. The compression-molding method for a cylindrical tablet according to claim 1, wherein preparing a working curve based on the number of compression-molding and the difference between the diameter of the core punch at the portion for forming the center opining of a cylindrical tablet before compression-molding and the smallest diameter of the portion after compression-molding; predicting before compression-molding the number of compression-molding based on the working curve in the estimation that the difference between the reference diameter of the portion in design and the smallest diameter exceeds 0.04 mm due to the wearing of the portion; measuring the smallest diameter of the core punch at the portion for forming the center opening of the cylindrical tablet before the number of compression-molding, after the initiation of compression-molding, reaches the predicted number, and exchanging the core punch to a new core punch so that the difference between the reference diameter and the smallest diameter is within 0.04 mm.

3. The compression-molding method for a cylindrical tablet according to claim 1, wherein calculating the standard deviation and the averaged value of compression-molding pressure based on compression-molding pressures on each punch in one turn of the rotary table, the compression-molding pressures being detected by a sensor located at either one of the upper and lower rollers; measuring the smallest diameter of the core punch at the portion for forming the center opening of the cylindrical tablet when the compression-molding pressure of punch is smaller than the value obtained by subtracting the standard deviation multiplied with a coefficient of 2 to 5 from the averaged value, and exchanging the core punch so that the difference between the reference diameter and the smallest diameter is within 0.04 mm.

4. The compression-molding method for a cylindrical tablet according to claim 1, wherein measuring precisely the smallest diameter of the core punch at the portion for forming the center opening of a cylindrical tablet with a contactless measuring device capable of reading at least 0.01 mm as the smallest value.

5. The compression-molding method for a cylindrical tablet according to claim 1, which comprises compression-molding into a cylindrical shape a composite oxide catalyst having the following formula (1) and containing molybdenum as the main component, to be used for a gas phase catalytic oxidation reaction of an olefin or tertiary butanol to produce the corresponding unsaturated aldehyde and/or unsaturated carboxylic acid:

MoaBibCocNidFeeXfYgZhQiSijOk (1)

(wherein X represent at least one element selected from the group consisting of Na, K, Rb, Cs and Tl, Y represents at least one element selected from the group consisting of B, P, As and W, Z represents at least one element selected from the group consisting of Mg, Ca, Zn, Ce and Sm, Q represents a halogen atom, and a to k represent atomic ratios of the respective elements, provided that when a=12, $0.5 \leqq b \leqq 7$, $0 \leqq c \leqq 10$, $0 \leqq d \leqq 10$, $1 \leqq c+d \leqq 10$, $0.05 \leqq e \leqq 3.0$, $0.0005 \leqq f \leqq 3$, $0 \leqq g \leqq 3$, $0 \leqq h \leqq 1$, $0 \leqq i \leqq 0.5$ and $0 \leqq j \leqq 40$, and k is a numerical value satisfying the oxidized states of other elements.)

6. The compression-molding method for a cylindrical tablet according to claim 1, which comprises compression-molding into a cylindrical shape a composite oxide catalyst having the following formula (2) and containing molybdenum as the main component, to be used for a gas phase catalytic oxidation reaction of an unsaturated aldehyde to produce the corresponding unsaturated carboxylic acid:

MoaVbCucXdYeZfOg (2)

(wherein X represent at least one element selected from the group consisting of W and Nb, Y represents at least one element selected from the group consisting of Fe, Co, Ni and Bi, Z represents at least one element selected from the group consisting of Ti, Zr, Ce, Cr, Mn and Sb, and a, b, c, d, e, f and g represent atomic ratios of the respective elements, provided that when a=12, $1 \leqq b \leqq 12$, $0 \leqq c \leqq 6$, $0 \leqq d \leqq 12$, $0 \leqq e \leqq 100$ and $0 \leqq f \leqq 100$, and g is the number of oxygen atoms required to satisfy the atomic valence of the above respective components.)

7. The compression-molding method for a cylindrical tablet according to claim 5, wherein the composite oxide catalyst has an opening in the longitudinal direction so that the outer diameter is from 3 to 10 mm, the length is from 0.5 to 2 times the outer diameter and the inner diameter is from 0.1 to 0.7 time the outer diameter.

* * * * *